(12) United States Patent
Abbondanzio et al.

(10) Patent No.: US 10,637,736 B2
(45) Date of Patent: Apr. 28, 2020

(54) ACQUISITION OF INFORMATION FROM MANAGED COMPUTING DEVICE NOT COMMUNICATIVELY CONNECTED TO MANAGEMENT COMPUTING DEVICE

(71) Applicant: Lenovo Enterprise Solutions (Singapore) PTE. LTD., New Tech Park (SG)

(72) Inventors: Antonio Abbondanzio, Raleigh, NC (US); Matthew Robert Alcorn, Durham, NC (US); James Gordon McLean, Raleigh, NC (US); Jared Siirila, Morrisville, NC (US); Randall William Worzella, Raleigh, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 81 days.

(21) Appl. No.: 15/174,469

(22) Filed: Jun. 6, 2016

(65) Prior Publication Data

US 2017/0353357 A1    Dec. 7, 2017

(51) Int. Cl.
*H04L 12/24* (2006.01)
*H04L 29/08* (2006.01)
*H04L 29/06* (2006.01)

(52) U.S. Cl.
CPC .............. *H04L 41/12* (2013.01); *H04L 67/10* (2013.01); *H04L 67/14* (2013.01); *H04L 67/18* (2013.01); *H04L 67/26* (2013.01); *H04L 67/42* (2013.01)

(58) Field of Classification Search
CPC .......... H04L 41/12; H04L 67/14; H04L 67/10
See application file for complete search history.

(56) References Cited

U.S. PATENT DOCUMENTS

| 5,550,815 A | 8/1996 | Cloonan et al. |
| 5,845,116 A | 12/1998 | Saito et al. |

(Continued)

OTHER PUBLICATIONS

"How to Enable Instant Hotspot in iOS 8 and How It Works", online <http://www.igeeksblog.com/how-to-enable-instant-hotspot-in-ios-8/>, Jan. 7, 2015, 10 pp.

(Continued)

*Primary Examiner* — Uzma Alam
(74) *Attorney, Agent, or Firm* — Kunzler Bean & Adamson, PC; Bruce R. Needham

(57) ABSTRACT

A management computing device determines that a client computing device is able to assist in acquiring information from a managed computing device to satisfy a current communication need of the management computing device regarding the managed computing device. The management computing device is not communicatively connected to the managed computing device. The management computing device transmits a request to the client computing device to assist in acquiring the information to satisfy the current communication need. The management computing device receives the information to satisfy the current communication need, such as from the client computing device directly, or from the managed computing device after a user of the client computing device has initiated temporary communication connectivity between the management computing device and the managed computing device.

17 Claims, 6 Drawing Sheets

(56) References Cited

U.S. PATENT DOCUMENTS

| | | | |
|---|---|---|---|
| 6,438,110 B1 | 8/2002 | Rai et al. | |
| 6,529,498 B1 | 3/2003 | Cheng | |
| 6,563,835 B1 | 5/2003 | Chen | |
| 6,584,071 B1 | 6/2003 | Kodialam et al. | |
| 7,281,058 B1 | 10/2007 | Shepherd et al. | |
| 7,792,989 B2* | 9/2010 | Toebes | H04L 67/1021 |
| | | | 709/223 |
| 7,796,520 B2* | 9/2010 | Poustchi | H04L 67/1068 |
| | | | 370/236 |
| 8,650,279 B2* | 2/2014 | Mehta | H04W 8/082 |
| | | | 709/223 |
| 9,197,627 B2* | 11/2015 | Hirsh | H04L 63/0815 |
| 10,111,273 B2 | 10/2018 | Abbondanzio et al. | |
| 2005/0066052 A1 | 3/2005 | Gupta et al. | |
| 2005/0278419 A1* | 12/2005 | Morris | H04L 67/36 |
| | | | 709/203 |
| 2006/0117020 A1* | 6/2006 | Toebes | H04L 67/1021 |
| 2006/0136893 A1* | 6/2006 | Blossom | G06F 8/60 |
| | | | 717/168 |
| 2006/0268805 A1* | 11/2006 | Kawai | G06F 3/1204 |
| | | | 370/338 |
| 2010/0063999 A1* | 3/2010 | Hur | G06Q 30/06 |
| | | | 709/203 |
| 2012/0226739 A1* | 9/2012 | Kim | H04W 4/50 |
| | | | 709/203 |
| 2013/0007237 A1* | 1/2013 | Mehta | H04W 8/082 |
| | | | 709/223 |
| 2013/0039343 A1* | 2/2013 | Hori | H04W 36/12 |
| | | | 370/331 |
| 2013/0091283 A1 | 4/2013 | Omar | |
| 2013/0336192 A1 | 12/2013 | Zhao et al. | |
| 2014/0063057 A1* | 3/2014 | Eronen | H04N 5/23206 |
| | | | 345/633 |
| 2015/0046830 A1* | 2/2015 | Formo | H04W 76/10 |
| | | | 715/740 |
| 2015/0121470 A1* | 4/2015 | Rongo | H04W 4/70 |
| | | | 726/4 |
| 2016/0110284 A1 | 4/2016 | Athalye et al. | |
| 2016/0128123 A1 | 5/2016 | Li | |
| 2016/0180045 A1* | 6/2016 | Syed | G06F 19/3418 |
| | | | 705/3 |
| 2016/0202676 A1* | 7/2016 | Sato | G08O 17/00 |
| | | | 700/275 |
| 2016/0246896 A1 | 8/2016 | Arora et al. | |
| 2017/0041398 A1* | 2/2017 | Kumar | G06F 9/54 |
| 2017/0186212 A1 | 6/2017 | Ai et al. | |
| 2017/0205791 A1* | 7/2017 | Yang | G06Q 10/20 |
| 2017/0207999 A1 | 7/2017 | Scott et al. | |
| 2017/0237815 A1* | 8/2017 | Arsenault | H04W 4/70 |
| | | | 709/217 |
| 2017/0280459 A1* | 9/2017 | Ogrinz | H04W 4/023 |
| 2017/0347364 A1 | 11/2017 | Abbondanzio et al. | |
| 2017/0353357 A1 | 12/2017 | Abbondanzio et al. | |

OTHER PUBLICATIONS

"LetsMeetApp—nearby friends notification on the App Store", online <https://itunes.apple.com/us/app/letsmeetapp-nearby-friends/id699409128?mt=8>, Oct. 23, 2015, 2 pp.

Snader et al., "Improving Security and Performance in the Tor Network through Tunable Path Selection", IEEE Transactions on Dependable and Secure Computing, Jul. 14, 2011, 15 pp.

U.S. Appl. No. 15/163,466, filed May 24, 2016, 55 pp.

Internet web page, http://windows.microsoft.com/en-US/windows-8/metered-internet-connections-frequently-asked-questions, as captured by Internet Archive Wayback Machine on Jan. 12, 2015, 3 pp.

\* cited by examiner

ACQUISITION OF INFORMATION FROM MANAGED COMPUTING DEVICE NOT COMMUNICATIVELY CONNECTED TO MANAGEMENT COMPUTING DEVICE

BACKGROUND

Entities like corporations and other organizations generally manage or have managed for them a large number of computing devices, such as servers. Such computing devices are typically managed from a different, management computing device, which may be a desktop or laptop computer, a tablet computing device, a smartphone, or another type of mobile or non-mobile computing device. An administrator, for instance, may log onto a managed computing device from a management computing device to change settings of the managed device, to install or uninstall software on the managed device, and so on. That is, the managed computing device is usually remotely accessed by a user, who may be in the same room as the managed device, in a different part of the same building or location, or even across the globe from where the managed device is located.

SUMMARY

An example method includes determining, by a management computing device, that a client computing device is able to assist in acquiring information from a managed computing device to satisfy a current communication need of the management computing device regarding the managed computing device. The management computing device is not communicatively connected to the managed computing device. The method includes transmitting, by the management computing device, a request to the client computing device to assist in acquiring the information to satisfy the current communication need. The method includes receiving, by the management computing device, the information to satisfy the current communication need.

An example non-transitory computer-readable data storage medium stores computer-executable code. A client computing device executes the code to receive a request from a management computing device to assist in acquiring information from a managed computing device to satisfy a current communication need of the management computing device regarding the managed computing device. The management computing device is not communicatively connected to the managed computing device. The client computing device executes the code to assist in acquiring the information from the managed computing device to satisfy the current communication need.

An example management computing device for a managed computing device includes communication hardware to communicate with client computing devices. The management computing device has no communicative connection with the managed computing device. The management computing device includes a processor, and a non-transitory computer-readable data storage medium storing computer-executable code executable by the processor. The code is executable by the processor to realize selection logic to select a given client computing device, from the client computing devices, which is able to assist in acquiring information from the managed computing device to satisfy a current communication need of the management computing device regarding the managed computing device. The code is executable by the processor to realize communication logic to transmit a request to the client computing device to assist in acquiring the information to satisfy the current communication need, and to receive the information to satisfy the current communication need.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
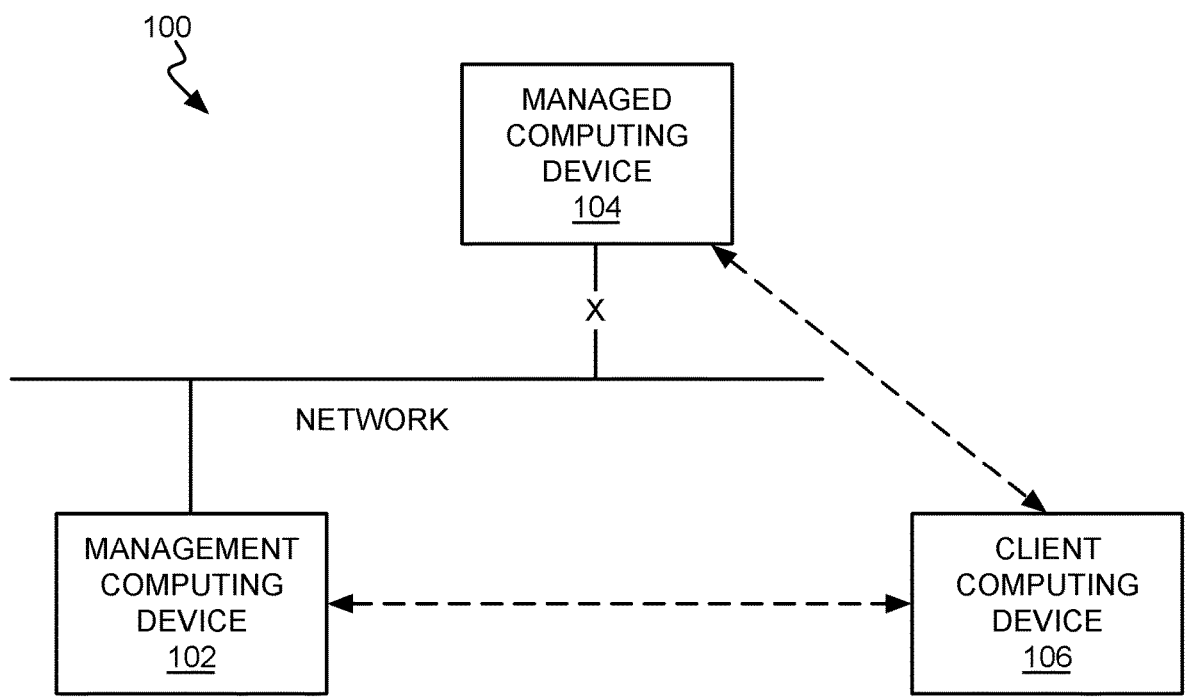
FIG. 1 is a diagram of an example system by which a management computing device acquires information from a managed computing device even though the management computing device is not communicatively connected to the managed computing device.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a managed computing device like a server is usually managed remotely from a management computing device. For instance, the managed computing device and the management computing device can be communicatively connected to one another over the same network, such as a local network, or the Internet. However, in some situations the managed computing device is not directly reachable from a management computing device. For example, the network connection between the managed computing device and the network may fail. As another example, for security reasons it may not be desired for the managed and management computing devices to be on the same network. In such instances, direct remote management of the managed computing device from the management computing device is essentially impossible.

Disclosed herein are techniques that address these and other shortcomings. An intermediary client computing device is employed as in effect a proxy between the management computing device and the managed computing device. The management computing device can transmit a request to the client computing device to assist in acquiring desired information from the managed computing device. As used herein, "assist in acquiring the desired information"

encompasses "acquiring the desired information," and is thus considered synonymous as used herein with "at least assist in acquiring the desired information." The management computing device thus instructs the user of the client computing device to travel to the location of the managed computing device. The client computing device may then communicatively connect with the managed computing device—such as directly in a wired or wireless fashion, for instance—to acquire the information, and then send the information back to the management computing device. For instance, the client computing device and the management computing device may be communicatively connected over a mobile data network, such as a long term evolution (LTE) network, and/or over the Internet.

The client computing device may also assist in acquiring the desired information from the managed computing device without actually acquiring the information itself. For example, the managed computing device may have network connectivity to the same network to which the management computing device does, but for security reasons this connectivity is turned off. The management computing device can instruct the user of the client computing device to travel to the location of the managed computing device, and turn on this network connectivity temporarily. The user may simply insert a network plug into a network jack of the managed computing device, for instance, or use the client computing device to connect to the managed computing device to turn on the connectivity. Once the managed computing device has communicatively connected with the management computing device, the latter device can acquire the desired information from the former device, and thereafter the network connectivity can again be turned off.

FIG. 1 shows an example system 100 by which a management computing device 102 of the system 100 acquires information from a managed computing device 104 of the system via a client computing device 106 at least assisting in the information acquisition. The managed computing device 104 may be a server, or another type of computing device that is subject to remote management. The management computing device 102 may be a host computing device responsible for management the managed computing device, and may also be a server or another type of computing device. The client computing device 106 may be a mobile computing device, such as a laptop computer, a tablet computing device, a smartphone, or another type of mobile computing device.

The management computing device 102 is communicatively connected to a network 108. The network 108 may be or include Ethernet networks, local-area networks (LANs), wide-area networks (WANs), intranets, extranets, the Internet, telephony networks, mobile data networks, wired networks, and wireless networks, among other types of networks. The managed computing device 104 is not communicatively connected to the network 108. The managed computing device 104 may purposefully be disconnected from the network 108 for security reasons, for instance, or its connection to the network 108 may have failed. As such, the management computing device 102 is not communicatively connected to the managed computing device 104.

The management computing device 102 has a current communication need regarding the managed computing device 104. To satisfy this current communication need, the management computing device 102 has to acquire information from the managed computing device 104, even though the management computing device 102 is not communicatively connected to the managed computing device. That is, the current communication need is the reason why the management computing device 102 has to communicate with the managed computing device 104 to receive information from the managed computing device 104. For example, this may include a need for current status information regarding the managed computing device 104. The communication need may be for current settings of the managed computing device 104. The communication need may be to configure settings of the managed computing device 104, and so on.

Therefore, the management computing device 102 transmits a request to the client computing device 106 for the client computing device 106 to at least assist the management computing device 102 to acquire the information to satisfy the current communication need. The client computing device 106 may be communicatively connected to the network 108, for instance, so that the device 106 can receive the request from the management computing device 102 over the network 108. The management computing device 102 may transmit a push notification to the client computing device 106, via a push server that itself may be communicatively connected to the network 108, as another example.

The request may specify that a user of the client computing device 106 physically move the client computing device to the location of the managed computing device 104. For example, the user of the client computing device 106 may be a network administrator who works in the same building in which the managed computing device 104 is located. The management computing device 102 may also be located in this building, or may be located at a different location. The request, such as a push notification, may include identifying information of the managed computing device 104 to assist the user to locate the device 104. For example, the managed computing device 104 may be one of a number of such devices installed on the same equipment rack within a room having a number of such equipment racks that each have devices installed therein. This identifying information can include the location of the managed computing device 104, as well as its serial number or other identifying information.

The client computing device 106 can at least assist in acquiring the information from the managed computing device 104 that the management computing device 102 to fulfill satisfy the current communication need in a number of different ways, which are described in detail later in the detailed description with reference to other figures. In general, there may be three basic approaches by which the client computing device 106 can achieve this functionality, however. First, once the client computing device 106 is located physically proximate to the managed computing device 104, a temporary direct wired or wireless communication connection may be established between the client computing device 106 and the managed computing device 104. The client computing device 106 requests the desired information from the managed computing device 104, which returns the information to the client computing device 106, and then the client computing device 106 transmits the information back to the management computing device 102.

Second, once the client computing device 106 is located physically proximate to the managed computing device 104, the user of the client computing device 106 may manually enter information on the client computing device 106 to satisfy the current communication need. The management computing device 102 may inform the user of what actions to perform in relation to the managed computing device 104 to obtain this information. The user may be requested to push buttons on the managed computing device 104, for instance, and then enter information on the client computing device 106 as to what the managed computing device 104 is displaying. The user may be requested to provide discernible status information of the managed computing device 104, such as whether it appears to be powered on and whether its cooling fans appear to be functional. In this approach, the client computing device 106 does not establish a communication connection with the managed computing device 104.

Third, once the client computing device 106 is located physically proximate to the managed computing device 104, the client computing device 106 may at least assist in initiating a temporary communication connection between the managed computing device 104 and the management computing device 102. For instance, the management computing device 102 may request, via the client computing device 106, the user to physically connect the managed computing device 104 to the network 108, such as via connecting a network cable to the device 104. As another example, the client computing device 106 may establish a temporary direct connection with the managed computing device 104, and via this connection configure the settings of the managed computing device 104 so that it communicates with the management computing device 102 over the network 108. In this latter example, the managed computing device 104 may be physically connected to the network 108, but not able to communicate over the network 108 until such communication capability has been enabled via the client computing device 106. Once the management computing device 102 has received the information from the managed computing device 104 to satisfy its current communication need, the temporary communication connection can be severed or terminated so that the devices 102 and 104 are again not communicatively connected with one another.

Figure 2:
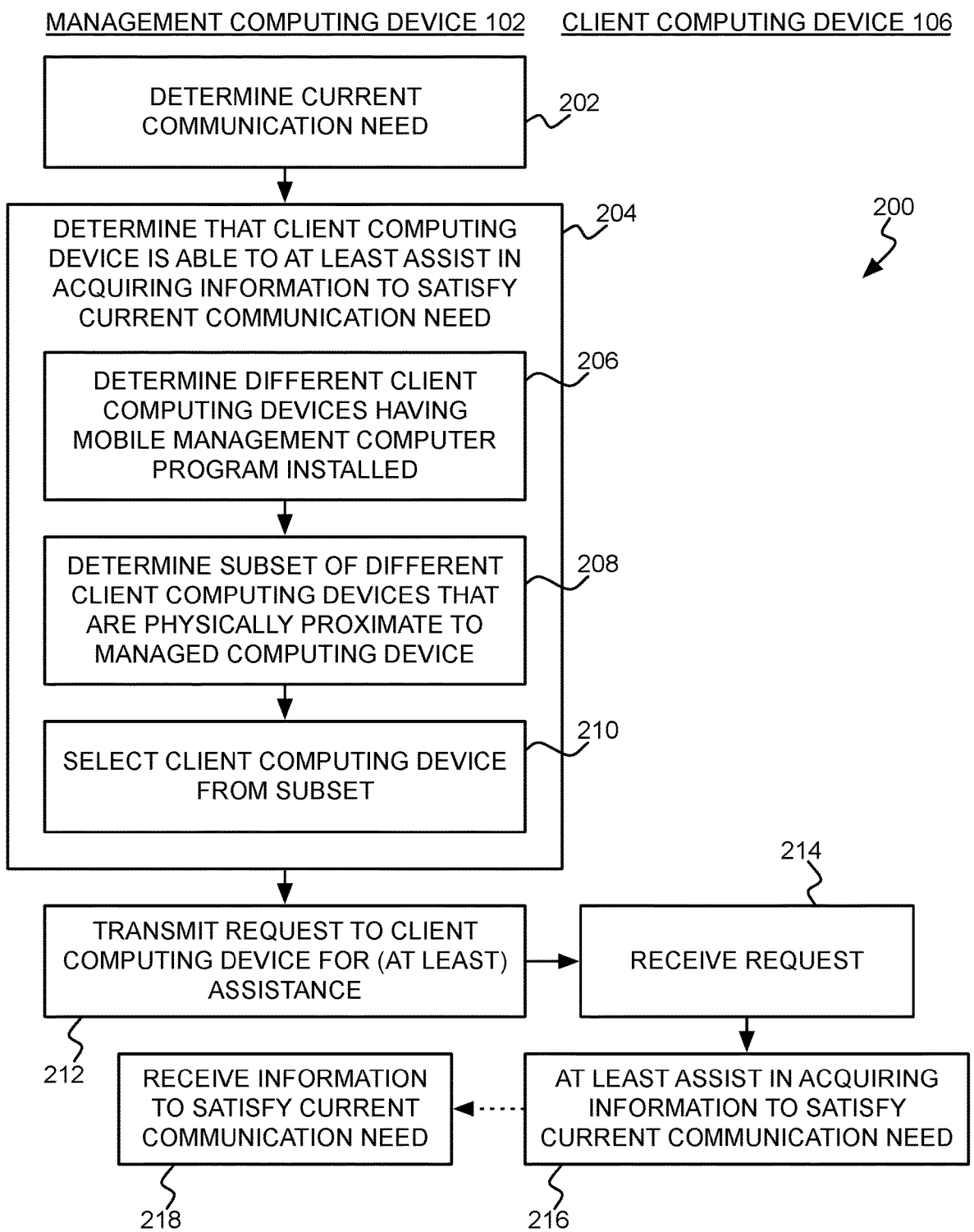
FIG. 2 is a flowchart of an example method by which a client computing device assists in acquiring information from a managed computing device to fulfill a current communication need of a management computing device regarding the managed computing device.

FIG. 2 shows an example method 200 by which the client computing device 106 at least assists in acquiring information from the managed computing device 104 to fulfill a current communication need of the management computing device 102 regarding the managed computing device 104. The parts of the method 200 in the left column of FIG. 2 are performed by the management computing device 102, whereas the parts in the right column are performed by the client computing device 106. For example, the left parts may be implemented as computer-executable code stored on a non-transitory computer-readable data storage medium and executed by a processor of the management computing device 102, and the right parts may be implemented as computer-executable code stored on a non-transitory computer-readable data storage medium and executed by a processor of the client computing device 106.

The management computing device 102 determines that a current communication need regarding the managed computing device 104 exists (202). For example, if the management computing device 102 and managed computing device 104 are normally communicatively connected with one another, and the managed computing device 104 is not responding such that the devices 102 are 104 are no longer communicatively connected, then the current communication need may be for information as to why the managed computing device 104 is not responding. As another example, although the managed computing device 104 may not be communicatively connected to the network 108 to which the management computing device 102 is, it may be connected to a different, more secure network to which the management computing device 102 is not. However, the management computing device 102 may still require periodic status information regarding the managed computing device 104, or the management computing device 102 may have been informed that the managed computing device 104 appears to be non-functional.

The management computing device 102 determines, or selects, the client computing device 106 that is able to at least assist in acquiring information from the managed computing device 104 to satisfy the current communication need (204). For instance, in one implementation, the management computing device 102 determines a number of different client computing devices that each have a mobile management computer program installed (206). The mobile management computer program may be a smartphone "app," for instance, by which a client computing device receives a request from the management computing device 102 to assist in acquiring information from the managed computing device 104. The different client computing devices as a set may be all the client computing devices of network administrators within an organization who are responsible in some way for managing the managed computing device 104.

The management computing device 102 determines the subset of these different client computing devices that are actually physically proximate to the managed computing device 104 (208). The mobile management computer program may, for instance, periodically report the location of the client computing device on which it is installed to the management computing device 102. The management computing device 102 can therefore determine from this information which client computing devices are physically proximate to the managed computing device 104. Physical proximity in this respect can be dictated by how urgent the current communication need and how important the need is. If the current communication need is relatively unimportant and not urgent, then, for example, a client computing device that is within an hour's drive of the location of the managed computing device 104 may be considered physically proximate. However, if the current communication need is relatively important and urge, then a client computing device located in the same building or on the same campus as the managed computing device 104 may just be considered physically proximate.

From this subset of different client computing devices, the management computing device 102 selects the client computing device 106 (210). The selection may be achieved in consideration of a number of factors. If the information to satisfy the current communication need is confidential, the client computing device 106 is selected as that of a user who has a sufficient authorization level to retrieve this information. The client computing device 106 may be selected based on its user's past history in responding to requests from the management computing device 102, so that more responsive users are selected. The client computing device 106 may be selected in a round-robin manner, so that the same user is not overburdened to travel to the managed computing device 104. The client computing device 106 may be selected in an activity-based manner, so that users who are currently engaged in other activities are not selected.

The management computing device 102 transmits a request to the client computing device 106 to at least assist in acquiring information from the managed computing device 104 to fulfill the current communication need (212). This request may be in the form of a push notification sent by the management computing device 102. The client computing device 106 receives the request (214). For instance, the mobile management computer program running on the client computing device 106 may receive the request from the management computing device 102.

The client computing device 106 thus at least assists in acquiring the information from the managed computing device 104 to fulfill the management computing device 102's current communication need regarding the managed computing device 104 (216). The management computing device 102 ultimately receives the information to satisfy its current communication need (218), either from the client computing device 106, or from the managed computing device 104 directly. Particular implementations of the three basic approaches by which the client computing device 106 can at least in assist in acquiring the information from the managed computing device 104 to fulfill the management computing device 102's current communication need are now described in detail. It is noted that aspects of these three basic approaches can overlap with one another, such that various parts of them can be modified and combined to yield other approaches. In this respect, the basic approaches are not mutually exclusive with one another.

Figure 3:
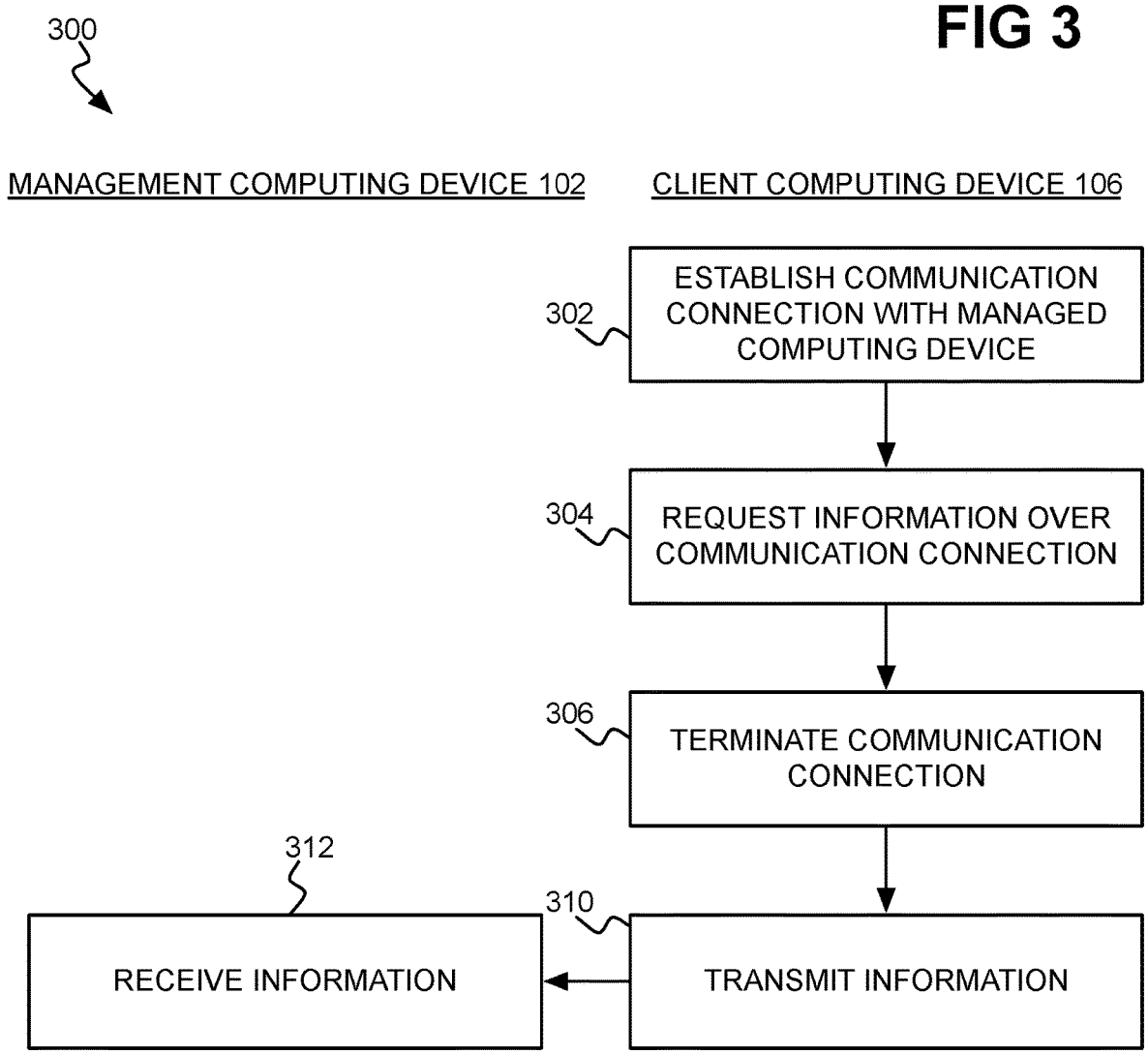
FIGS. 3, 4, and 5 are flowcharts of example methods of different approaches by which a client computing device can assist in acquiring information from a managed computing device to fulfill a current communication need of a management computing device regarding the managed computing device.

FIG. 3 shows an example method 300 of an implementation of a first approach by which the client computing device 106 at least assists in acquiring the information from the managed computing device 104 to fulfill the management computing device 102's current communication need regarding the managed computing device 104. The right parts of the method 300 are performed by the client computing device 106 and can implement part 216 of the method 200. The left parts of the method 300 are performed by the management computing device 102 and can implement part 218 of the method 200. The approach of the method 300 is such that the client computing device 106 directly acquires the information from the managed computing device 104 for the management computing device 102, which directly receives this information from the client computing device 106.

The client computing device 106 establishes a temporary and direct communication connection with managed computing device 104 (302). This connection can be a peer-to-peer connection, which may be considered more secure than, for instance, connecting the computing devices 106 and 104 to a common network. Examples of such a connection include a Bluetooth wireless connection, a near-field communication (NFC) wireless connection, as well as a Wi-Fi Direct or an ad hoc Wi-Fi wireless connection. Other examples of such a connection include a wired connection, where a cable such as a universal serial bus (USB) cable is interconnected between the computing devices 104 and 106.

The client computing device 106 requests the information to fulfill the current communication need from the managed computing device 104 over the communication connection that has been established (304). As part of this request, the client computing device 106 may first present credentials to the managed computing device 104 so that the managed computing device 104 can authenticate the client computing device 106. The client computing device 106 responsively receives the information from the managed computing device 104 over the communication connection (306), and then may terminate the connection (308). The client computing device 106 further transmits the information to the management computing device 102 (102), such as over the network 108, and the management computing device 102 receives the requested information directly from the client computing device 106 (312).

Figure 4:
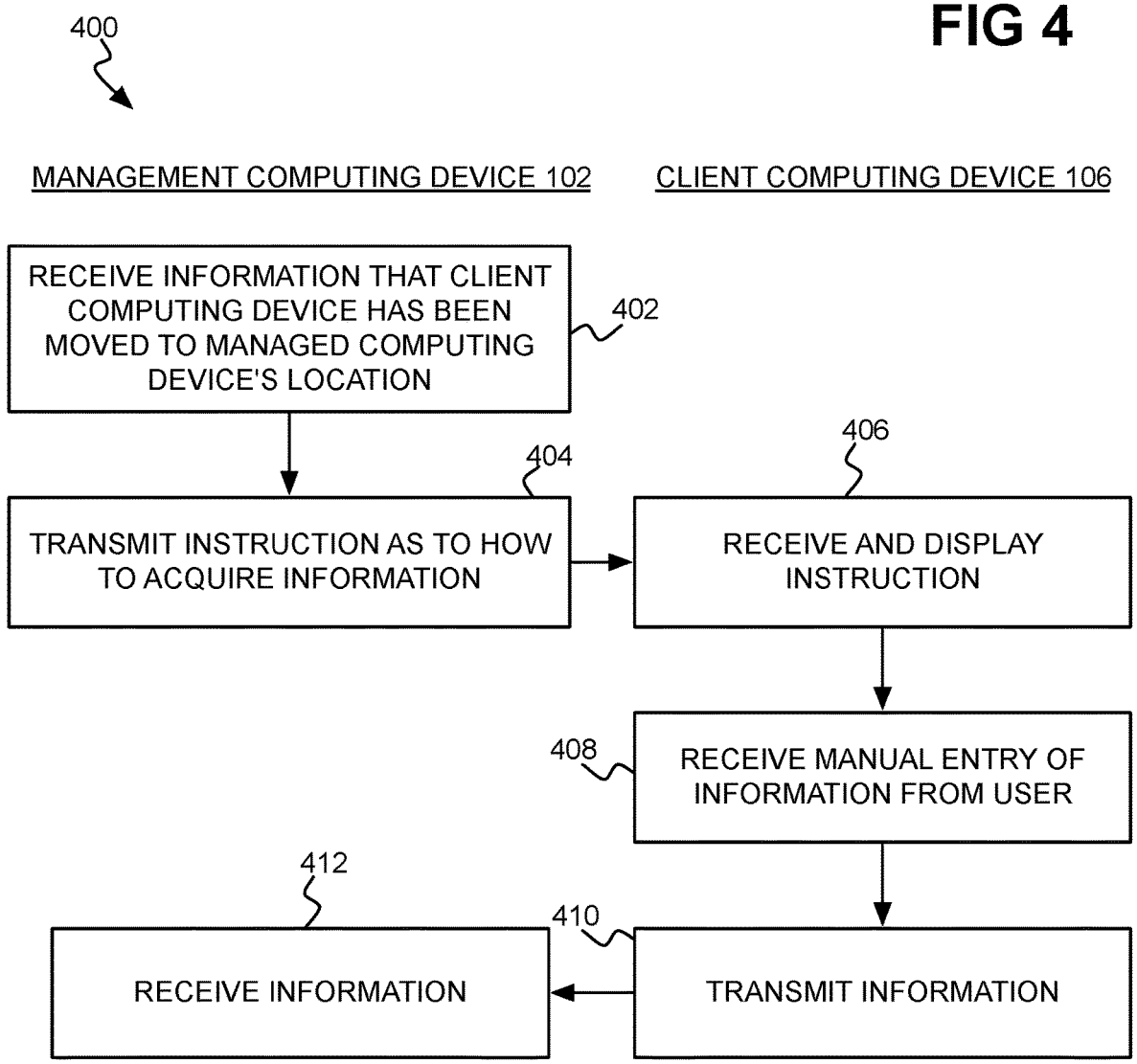

FIG. 4 shows an example method 400 of an implementation of a second approach by which the client computing device 106 at least assists in acquiring the information from the managed computing device 104 to fulfill the management computing device 102's current communication need regarding the managed computing device 104. The right parts of the method 400 are performed by the client computing device 106 and can implement part 216 of the method 200. The left parts of the method 400 are performed by management computing device 102 and part 412 can implement part 218 of the method 200. The approach of the method 400 is such that the client computing device 106 indirectly acquires the information from the managed computing device 104 via user entry of the information on the client computing device 106, and is such that the management computing device 102 directly receives the information from the client computing device 106.

The management computing device 102 can receive indication that the client computing device 106 has been moved by the device 106's user to the same location as the managed computing device 104 (402). For example, if the mobile management computer program running on the client computing device 106 sends the location of the device 106 to the management computing device 102, then the management computing device 102 will automatically be able to detect that the user of the client computing device 106 has moved the device 106 to the managed computing device 104. As another example, the user of the client computing device 106 may via the mobile management computer program notify the management computing device 102 that he or she has located the managed computing device 104 and is at the location of the managed computing device 104.

The management computing device 102 can transmit an instruction as to how to acquire the information from the managed computing device 104 (404), and the client computing device 106 can receive and display this instruction to the user of the device 106 (406). The client computing device 106 receives manual entry of the information as input by the user (408), and transmits the information to the management computing device 102 (410). The management computing device 102 thus receives the information directly from the client computing device 106 (412).

The process of parts 404, 406, 408, 410, and/or 412 can be iterative. For example, the management computing device 102 may follow a script of instructions that guides the user step-by-step as to how to acquire the information. The user may perform each step, and at completion of the steps enter the requested information on the client computing device 106 for transmission to the management computing device 102. As another example, the user may enter interim information after performing some of the steps, which the management computing device 102 or the client computing device 106 uses to determine the next step to display to the user. The actions that the user is to perform may be passive and/or active. The user may be requested to push buttons and perform other actions on the managed computing device 104, which is an active action. The user may be requested to just provide the colors of light-emitting diodes (LEDs), the number of such LEDs illuminated, the information that the managed computing device 104 is displaying on a status display, and so on, which are passive actions.

As a concrete example, the management computing device 102 may first instruct the user to indicate whether the managed computing device 104 is connected to a power source, such as via being connected to an alternating current (AC) mains outlet, and whether the device 104 is turned on. If the user, via the client computing device 106, answers in the affirmative, the management computing device 102 may then ask whether any LEDs on the device 104 are illuminated. If the user answers in the affirmative, the management computing device 102 may ask for detailed information regarding which LEDs are illuminated, and what color they are. Based on the user's response, the management computing device 102 may then ask the user to press various buttons on the managed computing device 104 in a particular order, and request the user enter the information that the managed computing device 104 displays in response.

Figure 5:
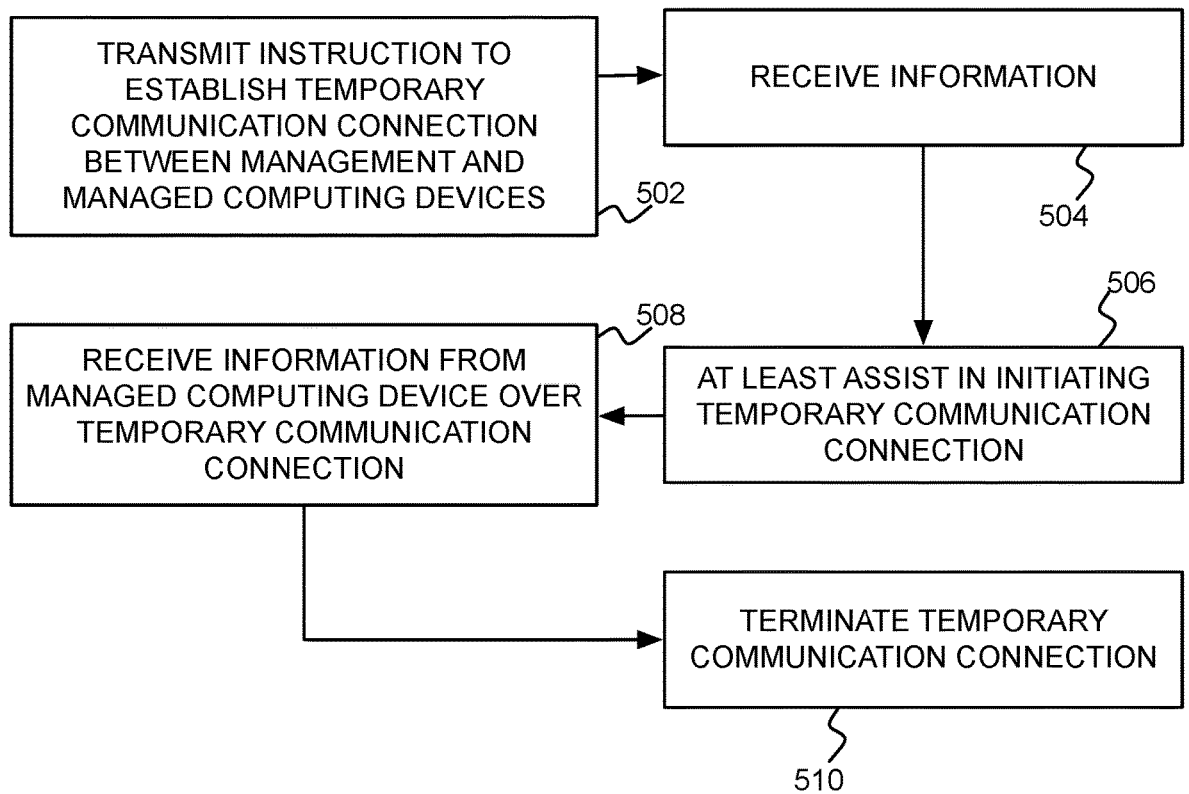

FIG. 5 shows an example method 500 of an implementation of a third approach by which the client computing device 106 at least assists in acquiring the information from the managed computing device 104 to fulfill the management computing device 102's current communication need regarding the managed computing device. The right parts of the method 500 are performed by the client computing device 106 and can implement part 216 of the method 200. The left parts of the method 500 are performed by the management computing device and part 508 can implement part 218 of the method 200. The approach of the method 500 is such that the client computing device 106 does not directly or indirectly acquire the information from the managed computing device 104, but rather assists in the acquisition of information via initiation of a temporary communication connection between the managed computing device 104 and the management computing device 102. The management computing device 102 thus directly receives the information from the managed computing device 104.

The management computing device 102 transmits an instruction to establish a temporary communication connection between itself and the managed computing device 104 (502). The client computing device 106 receives this instruction (504), and at least assist in initiating the temporary communication connection between the management and managed computing devices 102 and 104 (506). For example, the instruction may be to display to the user a request to connect a network cable that is already connected to the network 108 to the managed computing device 104. The client computing device 106 is said to assist in initiating the temporary communication connection, because the device 106 does not initiate the connection itself, but rather requests that the user make the connection.

As another example, the instruction may be that the client computing device 106 is to itself establish a temporary communication connection with the managed computing device 104, over which to configure the settings of the managed computing device 104 to permit the managed computing device 104 to connect to the network 108 so that the temporary communication connection between the management and managed computing devices 102 and 104 is established. In this respect, the client computing device 106 can be said to be initiating the temporary communication connection. This is because the client computing device 106 is configuring the settings of the managed computing device 104 that results in the managed computing device 104 connecting to the network 108 and thus establishing the temporary communication connection with the management computing device 102.

Once the temporary communication connection between the management computing device 102 and the managed computing device 104 has been established, the management computing device 102 directly receives the information to fulfill its current communication need over the temporary communication connection directly from the managed computing device 104 (508). The temporary communication connection may then be terminated (510). For instance, the user may be requested to physically disconnect the managed computing device 104 from the network 108 by disconnecting the cable that was previously connected, or the client computing device 106 may change the settings of the managed computing device 104 so that the device 104 is no longer actively connected to the network 108.

Figure 6:
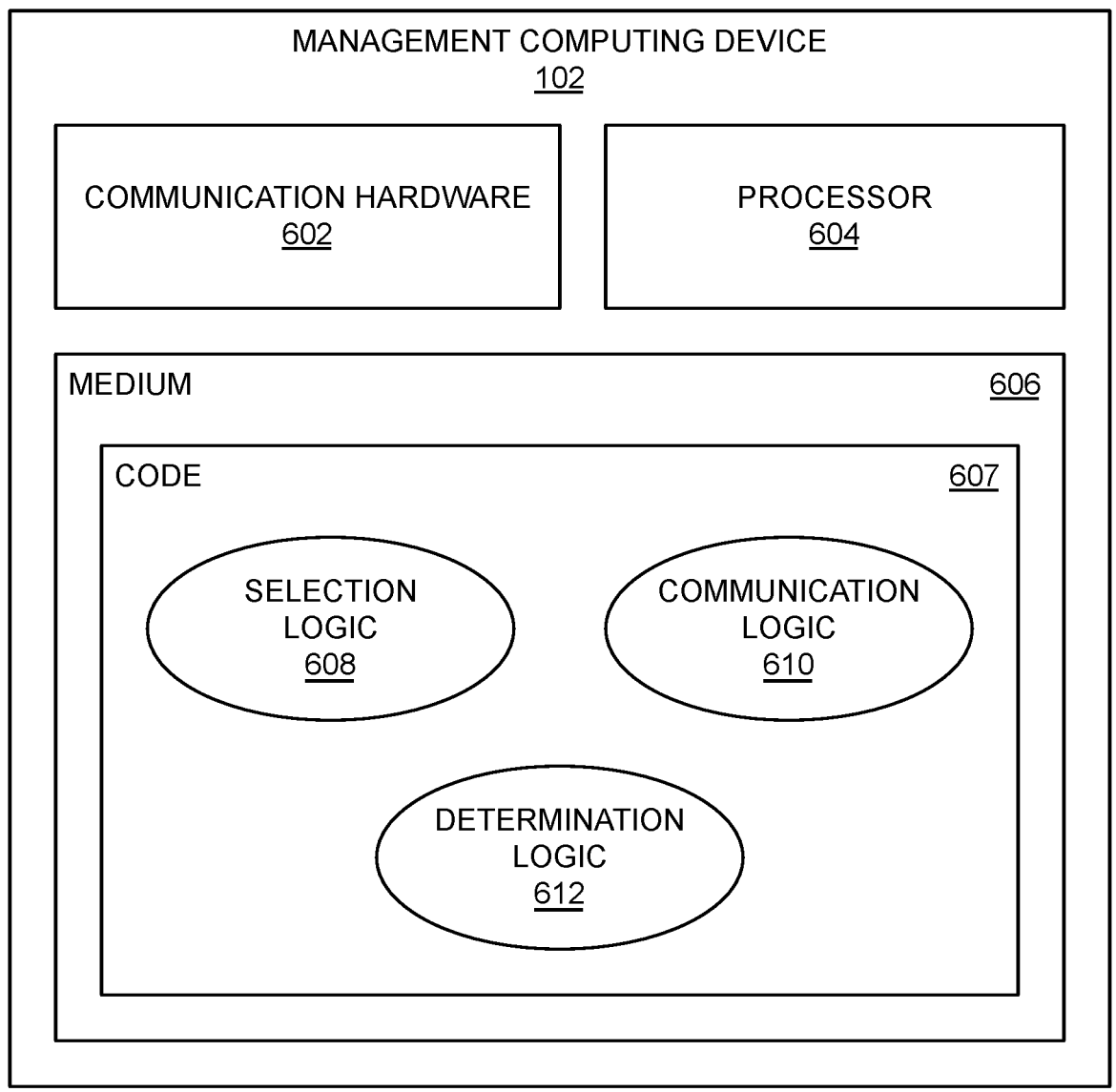
FIG. 6 is a diagram of an example management device.

FIG. 6 shows an example implementation of the management computing device 102. The management computing device 102 includes communication hardware 602 to permit the management device 102 to communicate with client computing devices, such as the client computing device 106, over the network 108. The management computing device 102 includes a processor 604 and a non-transitory computer-readable data storage medium 606 that stores computer-executable code 507. The processor 604 executes the code 607 to cause various logic 608, 610, and 612 to be performed or realized. That is, the code 607 implements the logic 608, 610, and 612.

The selection logic 608 selects the client computing device 106 from the client computing devices to which the management computing device 102 is communicatively connected, and thus performs part 204 of the method 204. The communication logic 610 transmits a request to the client computing device 106 to at least assist in acquiring information to satisfy a current communication need regarding the managed computing device 104 of FIG. 1, and also receives this information. As such, the communication logic 610 performs parts 212 and 218 of the method 200. The determination logic 612 determines that the current communication need exists, and thus performs part 202 of the method 200.

The techniques that have been described thus permit a management computing device to acquire information to satisfy a current communication need regarding a managed computing device, even though there is no communicative connection between the management and managed computing devices. Rather, a client computing device is used to at least assist in acquiring the information. The client computing device can acquire and transmit the information itself, or can at least assist in establishing a temporary connection between the management and managed computing devices over which this information is transmitted.

As used herein, a computing device can be a physical computing device running a single instance of an operating system (OS). A computing device can also including a virtual computing device, such as a container or virtual machine. For instance, a number of virtual machines, each with its own guest OS, can run on a single physical computing device, or even in a distributed fashion over a number of computing devices. In such instance, a virtual machine may be migrated from one set of computing hardware resources to another set of computing hardware resources, such as from one physical computing device to another, without a user or the virtual machine being aware.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
responsive to a management computing device having a current communication need regarding a managed computing device, and responsive to the management computing device being temporarily unable to communicate directly with the managed computing device, identifying, by the management computing device, a client computing device that is able to assist in acquiring information from the managed computing device to satisfy the current communication need of the management computing device regarding the managed computing device, the management computing device not communicatively connected to the managed computing device, wherein the managed computing device is managed remotely by the management computing device and wherein the client computing device is a mobile device;

transmitting, by the management computing device, a request to the client computing device to assist in acquiring the information to satisfy the current communication need, the request specifying that a user of the client computing device is to, at a location of the managed computing device, initiate temporary communication connectivity between the management computing device and the managed computing device, wherein at least a portion of the transmission from the management computing device to the client computing device is wireless; and in response to the client computing device moving to the location of the managed computing device, receiving, by the management computing device, the information to satisfy the current communication need after the user of the client computing device has initiated the temporary communication connectivity between the management computing device and the managed computing device.

2. The method of claim 1, further comprising:
determining, by the management computing device, that the current communication need exists,
wherein the management computing device determines that the client computing device is able to assist in acquiring the information after determining that the current communication need exists.

3. The method of claim 1, wherein determining that the client computing device is able to assist in acquiring the information from the managed computing device to satisfy the current communication need comprises:
determining the client computing device as one of a plurality of different client computing devices that each have installed thereon a mobile management computer program.

4. The method of claim 1, wherein determining that the client computing device is able to assist in acquiring the information from the managed computing device to satisfy the current communication need comprises:
determining a plurality of different client computing devices, including the client computing device, that each have installed thereon a mobile management computer program;
determining a subset of the different client computing devices that are located physically proximate to the managed computing device; and
selecting the client computing device from the subset of the different client computing devices.

5. The method of claim 1, wherein transmitting the request to the client computing device to assist in acquiring the information to satisfy the current communication need comprises:

transmitting a push notification to the client computing device requesting that a user thereof physically move the client computing device to a location of the managed computing device,
wherein the push notification comprises identifying information of the managed computing device.

6. The method of claim 1, wherein receiving the information to satisfy the current communication need comprises receiving the information from the client computing device after the client computing device has acquired the information from the managed computing device.

7. The method of claim 6, wherein receiving the information to satisfy the current communication need and comprises, prior to receiving the information:
receiving indication that the client computing device has been physically moved to a location of the managed computing device;
transmitting an instruction to the client computing device guiding the user as to what actions to perform in relation to the managed computing device to acquire the information to satisfy the current communication need.

8. A non-transitory computer-readable data storage medium storing computer-executable code that a client computing device executes to:
receive a request from a management computing device to assist in acquiring information from a managed computing device to satisfy a current communication need of the management computing device regarding the managed computing device, the management computing device temporarily not communicatively connected to the managed computing device, the request specifying that a user of the client computing device is to, at a location of the managed computing device, initiate temporary communication connectivity between the management computing device and the managed computing device, wherein the managed computing device is managed remotely by the management computing device, wherein at least a portion of the transmission of the request from the management computing device to the client computing device is wireless and wherein the client computing device is a mobile device; and
in response to the client computing device being moved to the location of the managed computing device, assist in acquiring the information from the managed computing device to satisfy the current communication need, by assisting in initiating the temporary communication connection over which the management computing device receives the information after the user of the client computing device has initiated at the location of the managed computing device the temporary communication connectivity between the management computing device and the managed computing device,
wherein the management computing device transmits the request to the client computing device responsive to having the current communication need regarding the managed computing device, and responsive to the management computing device being temporarily unable to communicate directly with the managed computing device without assistance from the client computing device.

9. The non-transitory computer-readable data storage medium of claim 8, wherein the client computing device executes the computer-executable code to assist in acquiring the information by:
establishing a communication connection with the managed computing device;

requesting the information from the managed computing device over the communication connection;

responsively receiving the information from the managed computing over the communication connection;

terminating the communication connection with the managed computing device; and transmitting the information to the management computing device.

10. The non-transitory computer-readable data storage medium of claim 8, wherein the client computing device executes the computer-executable code to assist in acquiring the information by:

receiving manual entry of the information from a user of the client computing device; and transmitting the information to the management computing device.

11. The non-transitory computer-readable data storage medium of claim 8, wherein the client computing device executes the computer-executable code to assist in acquiring the information by:

receiving an instruction from the management computing device guiding the user as to what actions to perform in relation to the managed computing device to acquire the information; and transmitting the information to the management computing device.

12. The non-transitory computer-readable data storage medium of claim 8, wherein the client computing device executes the computer-executable code to receive the request from the management computing device by:

receiving a push notification from the management computing device requesting that a user thereof physically move the client computing device to a location of the managed computing device, wherein the push notification comprises identifying information of the managed computing device.

13. A management computing device for a managed computing device, comprising:

communication hardware to communicate with a plurality of client computing devices, the management computing device temporarily having no communicative connection with the managed computing device, wherein the managed computing device is managed remotely by the management computing device and wherein the client computing devices are mobile devices;

a processor; and a non-transitory computer-readable data storage medium storing computer-executable code executable by the processor to realize:

selection logic to, responsive to the management computing device having a current communication need regarding the managed computing device, and responsive to the management computing device temporarily being unable to directly communicate with the managed computing device, select a given client computing device, from the client computing devices, which is able to assist in acquiring information from the managed computing device to satisfy the current communication need of the management computing device regarding the managed computing device; and communication logic to transmit a request to the client computing device to assist in acquiring the information to satisfy the current communication need, the request specifying that a user of the client computing device is to, move the client computing device to the location of the managed computing device and, at a location of the managed computing device, initiate temporary communication connectivity between the management computing device and the managed computing device; and communication logic to receive the information to satisfy the current communication need after the user of the client computing device has initiated the temporary communication connectivity between the management computing device and the managed computing device.

14. The management computing device of claim 13, wherein the computer-executable code is executable by the processor to further realize determination logic to determine that the current communication need exists.

15. The management computing device of claim 13, wherein the selection logic is to select the given client computing device by:

determining a subset of the client computing devices that are located physically proximate to the managed computing device; and choosing the given client computing device from the subset.

16. The management computing device of claim 13, wherein the communication logic is to receive the information to satisfy the current communication need by receiving the information from the given client computing device after the client computing device has acquired the information from the managed computing device.

17. The management computing device of claim 13, wherein the communication logic is to receive the information to satisfy the current communication need by, prior to receiving the information:

receiving indication from the given client computing device that a user thereof has physically moved the given client computing device to a location of the managed computing device; and transmitting an instruction to the given client computing device guiding the user as to what actions to perform in relation to the managed computing device to acquire the information to satisfy the current communication need.

* * * * *